Nov. 3, 1964     G. W. GRIMM ETAL     3,155,937
SYSTEM FOR DETERMINING VEHICLE PARAMETERS
Filed May 9, 1961     4 Sheets-Sheet 2

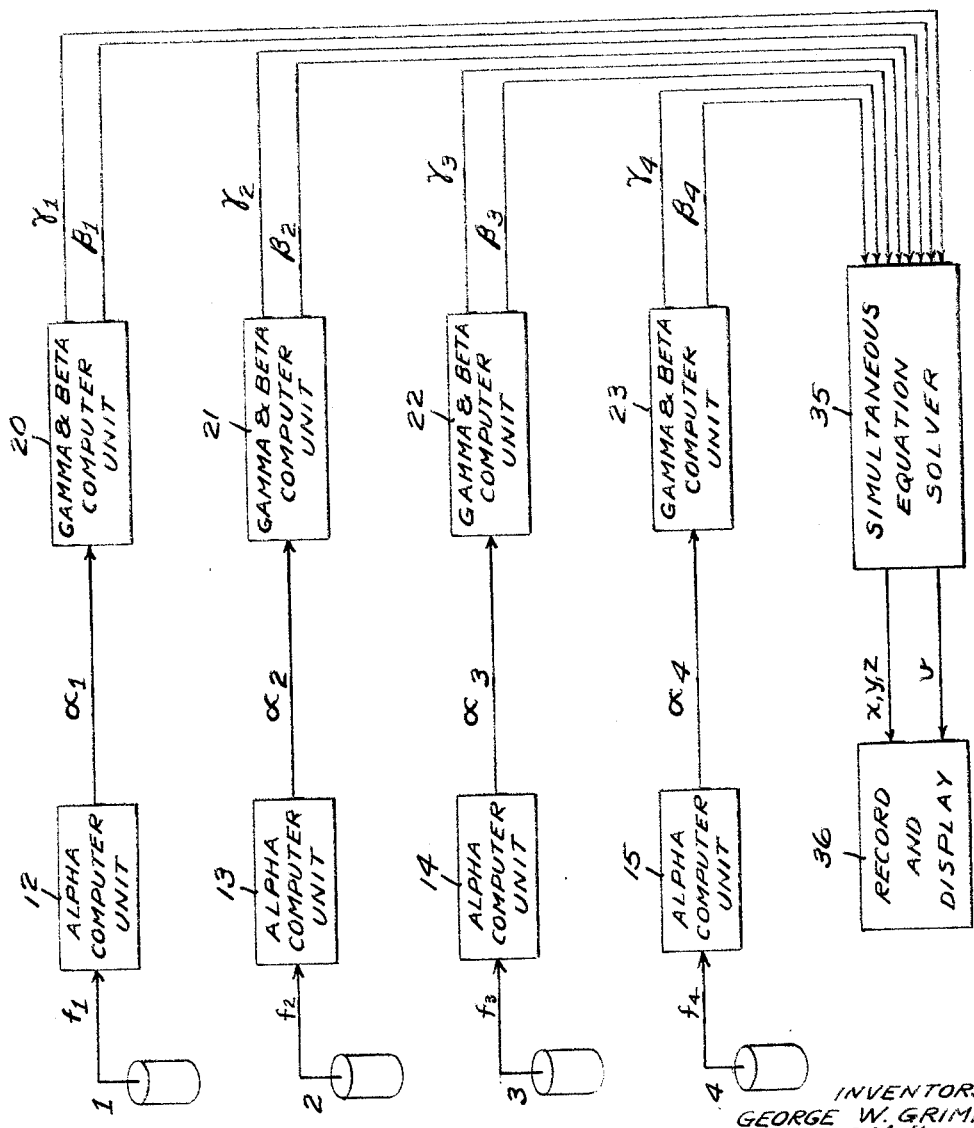

INVENTORS
GEORGE W. GRIMM
PATRICK J. McKEOWN
BY Bonet & Bonet
ATTORNEYS

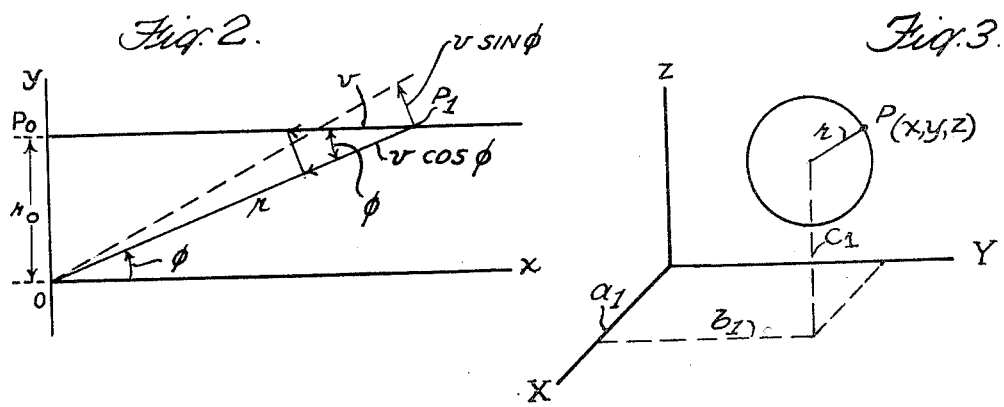
Fig. 2.
Fig. 3.
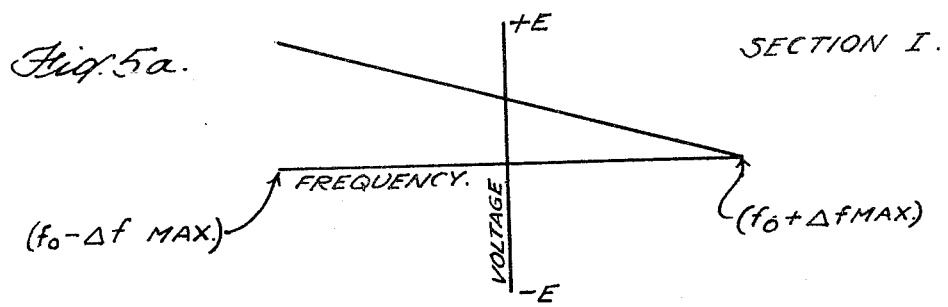
Fig. 5a.
SECTION I.
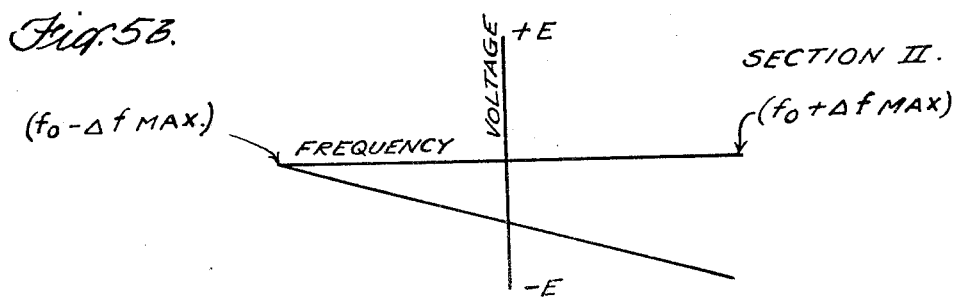
Fig. 5b.
SECTION II.
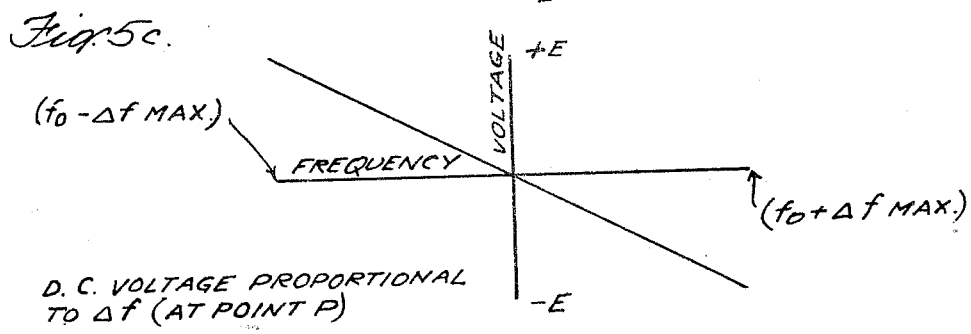
Fig. 5c.
D.C. VOLTAGE PROPORTIONAL TO $\Delta f$ (AT POINT P)

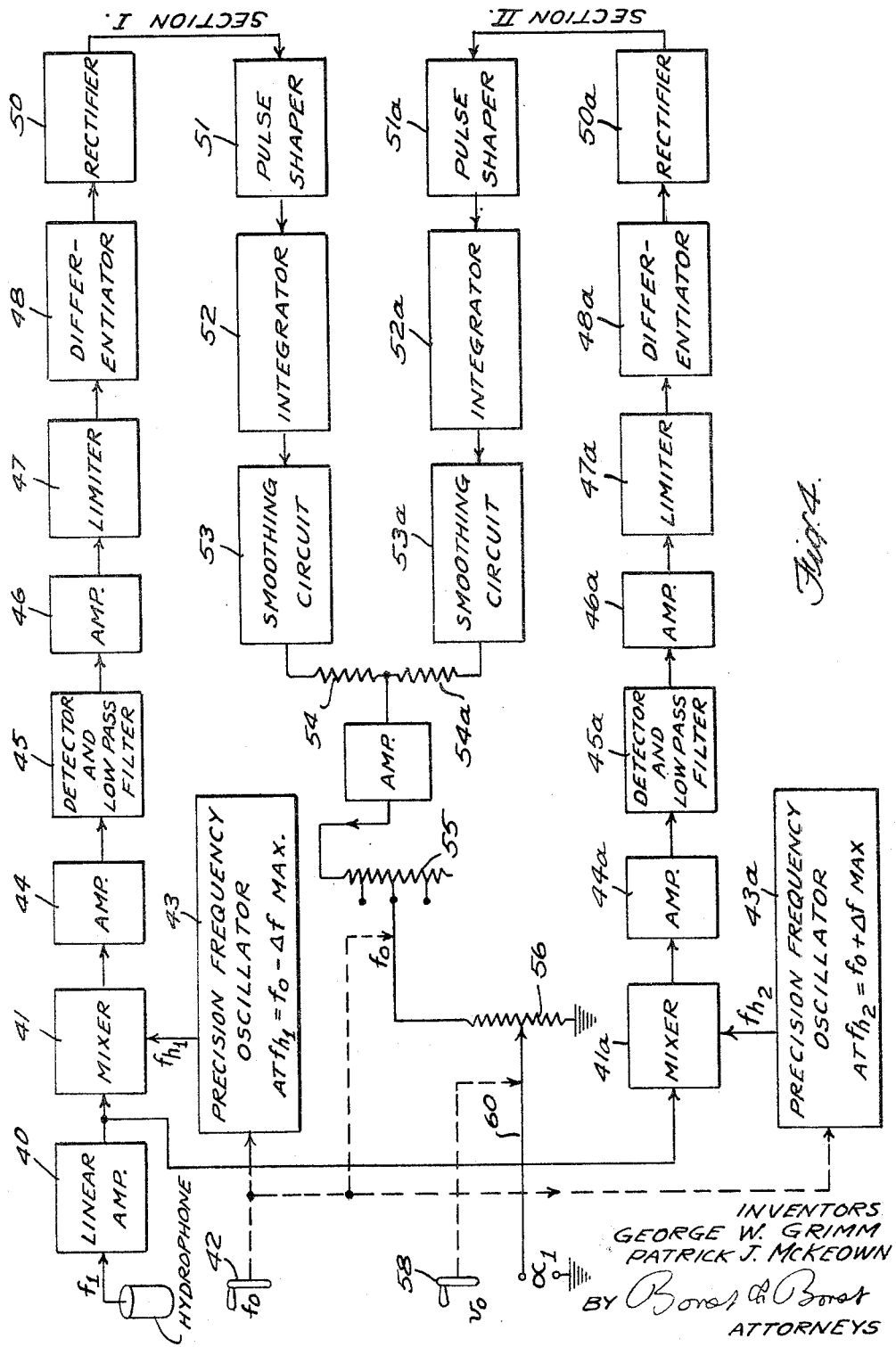

United States Patent Office 3,155,937
Patented Nov. 3, 1964

3,155,937
SYSTEM FOR DETERMINING VEHICLE
PARAMETERS
George W. Grimm, New York, and Patrick J. McKeown, Syosset, N.Y., assignors to Sperry Rand Corporation, Ford Instrument Company Division, Wilmington, Del., a corporation of Delaware
Filed May 9, 1961, Ser. No. 108,827
5 Claims. (Cl. 340—6)

This invention relates to navigation systems and particularly to systems for determining the position and velocity of a submerged vehicle.

Hitherto navigation systems for underwater vehicles and targets have depended on pulse techniques which, in general, require individual pulse identification in order to make the necessary computations. The desired information is derived as a function of time of pulse travel and certain other pulse characteristics. Because it must be certain that the pulse received is the pulse transmitted, the spacing of the transmitted pulse is limited for a given range unless rather complex expedients are adopted to identify the individual pulses. Since these techniques can only be employed to determine position at the time the pulse was transmitted, present position being extrapolated therefrom, it is desirable that the pulse repetition rate be high especially for the relatively fast and maneuverable underwater vehicles of today. Another advantage of high pulse repetition rate is that the high frequencies associated with the high pulse repetition rate are more quickly attenuated than low frequencies which is a pulse characteristic employed to limit its useful range so as to minimize the possibility of a receiver outside the range of interest being used in the computing process. It is because of this possibility that the receivers within the range of interest are normally rather closely spaced. However, as mentioned above, the need for pulse identification imposes a limit on the pulse repetition rate notwithstanding the advantages of a high rate.

The system which is arranged according to the present inventive concept avoids the problem of pulse repetition rate. It depends in essence on the use of a precision frequency projector which is located on the moving vehicle and a group of receivers of precisely known location and capable of accepting and passing to a computer the basic frequency of the projector plus or minus the Doppler frequency shift of this frequency. It is basically, therefore, a Doppler system for navigational computation as opposed to a pulse-time system in which the pulses travel from the projector to the target and back to the receiver.

The new system is employed to record and display position and velocity information. In addition, it may be associated with computers which can receive its coordinate position output to determine the instantaneous orientation of the vehicle and its velocity vector. While there are particular advantages in employing the system as an underwater navigation device, it may also be used in connection with surface and airborne vehicles which employ electromagnetic radiating devices.

One embodiment of the novel navigation system will now be described in detail, this description being taken in conjunction with the accompanying drawings, in which:

FIG. 1 is a block diagram of the system for determining vehicle parameters,

FIG. 2 is a velocity diagram in a single plane, FIG. 3 is a diagram showing hydrophone and vehicle positions in a reference coordinate system, FIG. 4 is a schematic of the alpha computer, FIGS. 5a . . . 5c are related frequency-voltage diagrams.

Figure 1A:
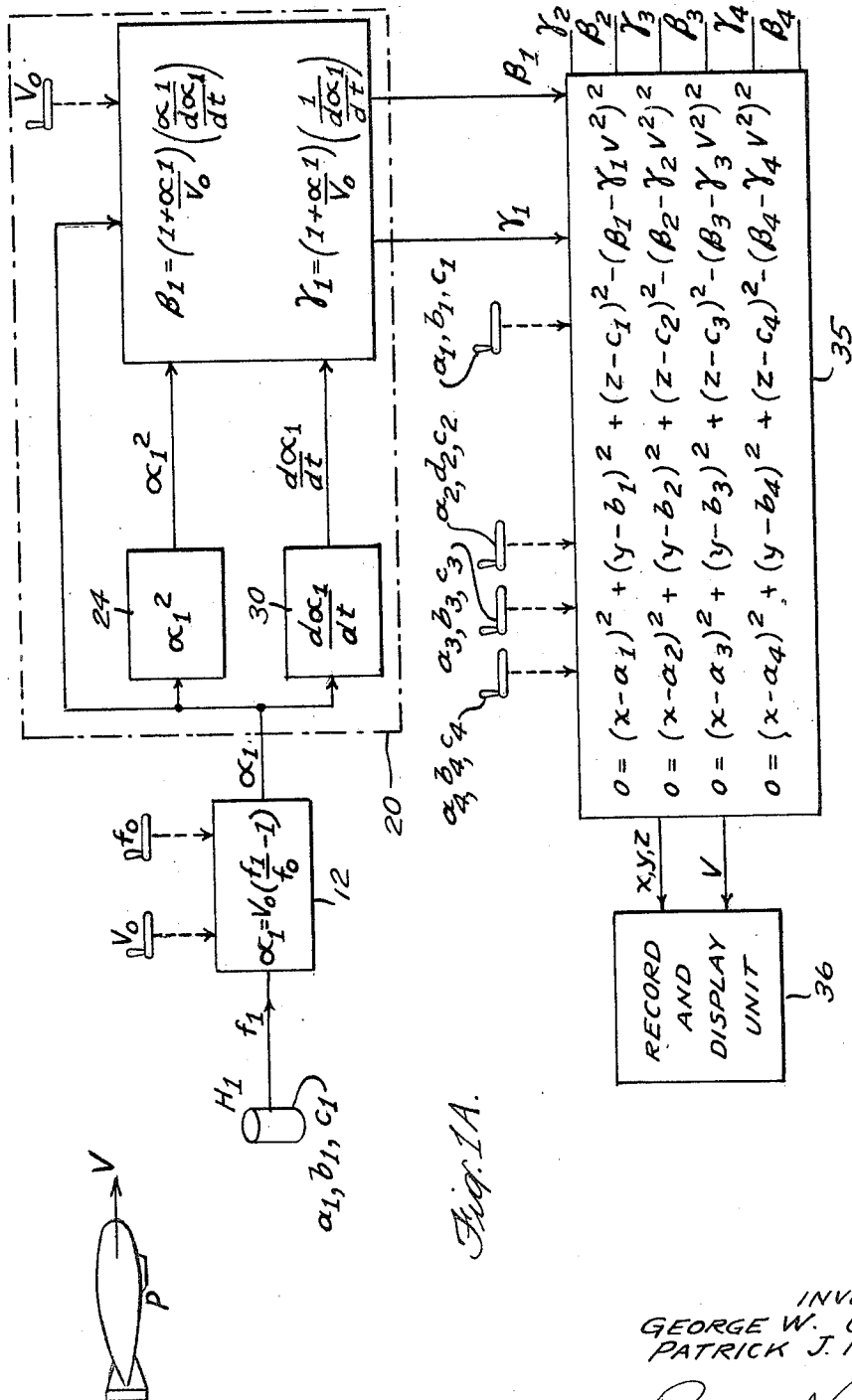
FIG. 1A is a block diagram of the gamma-beta computing unit which receives the output of the alpha computer for one of the hydrophones.

As shown in the block diagram of FIG. 1 there are provided four hydrophone receivers 1, 2, 3 and 4 located at known stations within the range of interest of a submarine. A precision frequency projector on the submarine transmits a sound frequency $f_0$ through the water medium at a velocity of $V_0$. The submarine and hydrophones are positioned with respect to a master coordinate system. The coordinates of the hydrophone 1 in this system are $a_1$, $b_1$, and $c_1$; the coordinates of the hydrophone 2 in the system are $a_2$, $b_2$ and $c_2$; the coordinates of the hydrophone 3 are $a_3$, $b_3$ and $c_3$; and the coordinates of the hydrophone 4 are $a_4$, $b_4$ and $c_4$.

Each of the hydrophones is connected to an alpha computing unit, and a gamma-beta computer which perform identical computations for the several hydrophones. The mathematical derivatives of the equations solved in the computers are set forth in the Appendix. The computers following the alpha computing units may be special purpose or the equations may be solved by any one of several standard general computers which are presently known and used such as the IBM 7090. The alpha computer units will be described below.

The alpha computing unit 12 is connected to receive the Doppler frequency $f_1$, from the hydrophone receiver 1 while the alpha computing units 13, 14 and 15 receive the Doppler frequencies $f_2$, $f_3$ and $f_4$ from the hydrophone receivers 2, 3 and 4 respectively. The alpha computing unit 12 solves the equation $$\alpha = V_0\left(\frac{f_1}{f_0} - 1\right)$$

with $V_0$ and $f_0$ being manually set into the units. Values for $V_0$ are also set into each of the gamma-beta computers 20, 21, 22 and 23 which solve the quantity $$\left(1 + \frac{\alpha_1}{V_0}\right)\left(\frac{\alpha^2_1}{\frac{d\alpha_1}{dt}}\right)$$

for beta and $$\left(1 + \frac{\alpha_1}{V_0}\right)\left(\frac{1}{\frac{d\alpha_1}{dt}}\right)$$

for gamma. As shown in FIG. 1A squaring unit 24 and differentiating circuit of gamma-beta computing unit 20 receive $\alpha_1$ from the alpha computer unit 12. Similarly squaring and differentiating units in gamma-beta computers 21, 22 and 23 receive alpha quantities from alpha computer units 13, 14 and 15 respectively.

A simultaneous equation solver 35 receives the gamma and beta outputs of each gamma-beta computing unit and also receives manually the known position coordinates $a$, $b$ and $c$ of the four hydrophones. Four equations are set up in the solver to solve for the four unknown quantities, namely the three position coordinates of the submarine $x$, $y$ and $z$ and its velocity $V$. The $x$, $y$ and $z$ positions are recorded and displayed on planar components and the velocity $V$ is visually indicated in the record and display unit 36.

The quantities $x$, $y$ and $z$ and $V$ may be placed into a vectorial quantity solver (not shown) for the purpose of determining vectorial velocity $V$ which is equal to $i\dot{x}+j\dot{y}+k\dot{z}$ and the instantaneous position of the submarines orientation $\overline{R}$ which is equal to $ix+jy+kz$.

From the examination of the equation for alpha, $\alpha$, it can be seen that alpha is equal to the Doppler quantity $f_1-f_0$ times a constant $V_0/f_0$. The alpha computing unit, therefore, derives quantities which are a function of $f_1-f_0$ in the form of a comparison D.C. voltage and multiplies the voltage by a constant representing the quotient of $V_0$ and $f_0$. To this end, as shown in FIG. 4, the alpha computer comprises two identical sections, Section I and Section II. The hydrophone output $f_1$ is placed in linear amplifier 40 the output of which is introduced to frequency mixer 41 in Section I and mixer 41a in Section II. The frequency $f_0$ projected from the submarine is also placed in the mixers by manual control 42 and precision frequency oscillators 43 and 43a respectively. The output of the oscillator 43 is $f_0 - \Delta f_{max}$ and the output of the oscillator 43a is $f_0 + \Delta f_{max}$ where $\Delta f$ is equal to the Doppler frequency shift $f_1 - f_0$. As shown in the Appendix alpha, $\alpha$, is equal to $$\frac{V_0}{f_0}(\Delta f)$$

for each hydrophone output computation; therefore, the quantity $\Delta f$ is necessary to compute. In general, this is achieved by combining two frequency-voltage straight line functions, which are each shown in FIG. 5a and FIG. 5b, respectively, so that the output is voltage proportioned to the Doppler frequency shift, the latter relation being shown in FIG. 5c. The components between the mixers and the voltage combining components are the same in the two sections so only one section will be described.

Amplifier 44 receives the output of the mixer 41 and the amplifier voltage representing the precision oscillator frequency with the hydrophone signal frequency impressed thereon is applied to detector and low pass filter 45 which pass an oscillation frequency proportioned to the difference between the hydrophone signal frequency and the precision oscillator frequency. The detected frequency is amplified by amplifier 46 and introduced to voltage limiter 47. Differentiator 48 receives the limiter output and is designed to produce sharp positive and negative pulses corresponding in magnitude to the detected frequency. Rectifier 50 cuts off the negative pulses in Section I and rectifier 50a cuts off the positive pulses in Section II. These pulses are further sharpened by pulse shaper 51 and 51a in the two sections and integrated to produce a generally straight line voltage function by integrators 52 and 52a, these functions being smoothed to produce the voltage frequency lines as shown in FIG. 5 by smoothing circuits 53 and 53a. The two voltages are respectively introduced to the two sides of network 54 the amplified output of which is proportional to the frequency shift $f_1 - f_0$. As shown in Equation 6 in the Appendix alpha is equal to the constant $V_0/f_0$ times the Doppler frequency shift $\Delta f$. Accordingly, the output of the network 54 is divided by $f_0$ by means of potentiometer 55, which is mechanically controlled by the manual insert 42 and multiplied by means of the potentiometer 56 whose wiper is driven by the manually operated crank 58. Values for alpha may then appear on the output lead 60.

APPENDIX

As was previously demonstrated:

(1) $$\alpha_1 = V_0\left(\frac{f_1}{f_0} - 1\right)$$

or (2) $$\alpha_1 = V_0\left(\frac{f_1 - f_0}{f_0}\right)$$

Since (3) $$f_1 - f_0 = \Delta f_1$$

the Doppler frequency shift the following relation is true:

(4) $$\alpha_1 = V_0\left(\frac{\Delta f_1}{f_0}\right)$$

or (5) $$\alpha_1 = \left(\frac{V_0}{f_0}\right)(\Delta f_1)$$

It is assumed that the hydrophone is at the center $O$ of an $x$, $y$ and $z$ coordinate system and that the underwater vehicle is located at point $P_1$, travelling to point $P_0$ with a velocity $v$, $r$ is the scale distance from the hydrophone to the vehicle and $r_0$ is the distance from the hydrophone to point $P_0$ which is the closest point the submarine is expected to reach relative to the hydrophone. (See FIG. 2.)

The frequency shift is proportional to the velocity component along the radius from the origin (hydrophone) to the position of the missile and can be expressed by the simple relation (6) $$f = f_0 \frac{(1 + v \cos \phi)}{V_0}$$

where $V_0$ is the velocity of sound in water or (7) $$v \cos \phi = v_0\left(\frac{f}{f_0} - 1\right) = \alpha$$

The quantity $$v_0\left(\frac{f}{f_0} - 1\right)$$

which we call $\alpha$ can be computed from the observed frequency $f$. Hence we have:

(8) $$\alpha = v \cos \phi$$

The rate of change of $\alpha$ with respect to time is by differentation.

(9) $$\dot{\alpha} = -v \sin \phi (\dot{\phi})$$

By looking at the figure we see that

(10) $$r\dot{\phi} = v \sin \phi$$

Combining these we get:

(11) $$\dot{\alpha} = -\frac{v^2}{r} \sin^2 \phi$$

where $\dot{\alpha}$ is obtained from data $\alpha$ by differentiation with respect to time. By squaring 8 and combining with 11 we obtain

(12) $$v^2 \cos^2 \phi + v^2 \sin^2 \phi = v^2 = \alpha^2 - r\dot{\alpha}$$

Hence

(13) $$r = \frac{\alpha^2 - v^2}{\dot{\alpha}}$$

*Correction Due to Elapsed Time*

It is to be noted that the sound wave travels through the water at velocity $v_0$. Thus the frequency of the sound wave in the immediate neighborhood of the missile reaches the hydrophone at a later time. Hence at the time when the data is received and the radius is calculated according to Equation 13, the missile has moved. Calling the quantity in Equation 13, $r$ calc., the true radius is $$r = r \text{ calc.} + \frac{dr}{dt} \text{ calc. } T$$

where $T$ is the elapsed time.

Now to consider FIGURE 2 and Formula 8 we see that

(14) $$\frac{dr}{dt} = v \cos \phi = \alpha$$

Also the elapsed time is:

(15) $$T = \frac{r \text{ calc.}}{v_0}$$

where $v_0$ is the velocity of the sound. Hence:

(16) $$r = r \text{ calc.} + \frac{\alpha r}{v_0} \text{ calc.}$$

$$= \left(1 + \frac{\alpha}{v_0}\right) r \text{ calc.}$$

Combining this result with Equation 13 gives the true distance to the missile at the time the distance is calculated.

(17) $$r = \left(1 + \frac{\alpha}{v_0}\right)\left(\frac{\alpha^2 - v^2}{\frac{d\alpha}{dt}}\right)$$

This formula may be written in a more convenient form. Separating terms:

(18) $$r = \left(1+\frac{\alpha}{v_0}\right)\left(\frac{\alpha^2}{\frac{d\alpha}{dt}}\right) - \left(1+\frac{\alpha}{v_0}\right)\left(\frac{1}{\frac{d\alpha}{dt}}\right)v^2$$

The first term is a quantity computed from the data and we call this $\beta$. Similarly the factors multiplying the $v^2$ term are computable from the data and we call this $\gamma$. Hence

(19) $\quad r = \beta - \gamma v^2$

This is our final formula for a single hydrophone in terms of the computable quantities $\beta$ and $\gamma$ and the as yet unknown $v$.

Hydrophone Arrays

In the foregoing, we have derived Formula 19 which gives the true "instantaneous" distance from a single hydrophone to a moving vehicle in terms of the data $\alpha$ and $$\frac{d\alpha}{dt}$$

and the unknown velocity magnitude $v$. A system of hydrophones will therefore give a distance from each one to the vehicle in terms of the common unknown $v$. To determine the position of a point in space with respect to a coordinate system we need three distances. Since the distances provided by the hydrophones contain an additional unknown quantity $v$, we have altogether four unknowns and we need four simultaneous equations. Therefore in general we need a minimum of four non-coplanar hydrophones. The following analysis will illustrate this case.

In FIG. 3 one hydrophone H is shown located at coordinates $a_1, b_1, c_1$. The data comes in to this hydrophone and we compute the constants $\beta_1$ and $\gamma_1$ and write Formula 19 in terms of $v^2$ as follows:

(20) $\quad r_1 = \beta_1 - \gamma_1 v^2$

In this formula $r_1$ is the distance in terms of $v^2$ from the hydrophone and we imagine a sphere surrounding it. The equation of this sphere is:

(21) $(x_1-a)^2 + (y_1-b)^2 + (z_1-c)^2 = r_1^2 = (\beta_1 - \gamma_1 v^2)^2$

Rewriting Equation 21 we get:

(22) $(x_1-a)^2 + (y_1-b)^2 + (z_1-c)^2 - (\beta_1 - \gamma_1 v^2)^2 = 0$

Similarly we get for the four hydrophones (rewriting above):

(23) $(x_1-a_1)^2 + (y_1-b_1)^2 + (z_1-c_1)^2 - (\beta_1-\gamma_1 v^2)^2 = 0$

(24) $(x_2-a_2)^2 + (y_2-b_2)^2 + (z_2-c_2)^2 - (\beta_2-\gamma_2 v^2)^2 = 0$

(25) $(x_3-a_3)^2 + (y_3-b_3)^2 + (z_3-c_3)^2 - (\beta_3-\gamma_3 v^2)^2 = 0$

(26) $(x_4-a_4)^2 + (y_4-b_4)^2 + (z_4-c_4)^2 - (\beta_4-\gamma_4 v^2)^2 = 0$

The quantities $a_1, b_1, c_1; a_2, b_2, c_2$ etc., are the positions of the hydrophones and are known.

The quantities $\beta_2, \gamma_1; \beta_2, \gamma_2$ etc., are calculated from incoming data and are therefore known.

The quantity $v$ common to all four equations is unknown. We are now looking for a solution to the above for a particular point in space; the $x$, $y$ and $z$ coordinates of the vehicle are, of course, the same. Therefore:

$$x_1 = x_2 = x_3 = x_4$$
$$y_1 = y_2 = y_3 = y_4$$
$$z_1 = z_2 = z_3 = z_4$$

Hence we can rewrite these equations as a set of simultaneous equations for the coordinates of the missile in terms of $x, y, z$.

Similarly we get the four hydrophones (rewriting above):

(23) $(x_1-a_1)^2 + (y_1-b_1)^2 + (z_1-c_1)^2 - (\beta_1-\gamma_1 v^2)^2 = 0$

(24) $(x_2-a_2)^2 + (y_2-b_2)^2 + (z_2-c_2)^2 - (\beta_2-\gamma_2 v^2)^2 = 0$

(25) $(x_3-a_3)^2 + (y_3-b_3)^2 + (z_3-c_3)^2 - (\beta_3-\gamma_3 v^2)^2 = 0$

(26) $(x_4-a_4)^2 + (y_4-b_4)^2 + (z_4-c_4)^2 - (\beta_4-\gamma_4 v^2)^2 = 0$

The quantities $a_1, b_1, c_1; a_2, b_2, c_2$ etc., are the positions of the hydrophones and are known.

The quantities $\beta_1, \gamma_1; \beta_2, \gamma_2$ etc., are calculated from incoming data and are therefore known.

The quantity $v$ common to all four equations is unknown. We are now looking for a solution to the above for a particular point in space; the $x$, $y$ and $z$ coordinates of the vehicle are, of course, the same. Therefore:

$$x_1 = x_2 = x_3 = x_4$$
$$y_1 = y_2 = y_3 = y_4$$
$$z_1 = z_2 = z_3 = z_4$$

Hence we can rewrite these equations as a set of simultaneous equations for the coordinates of the missile in terms of $x, y, z$.

(27) $(x-a_1)^2 + (y-b_1)^2 + (z-c_1)^2 - (\beta_1-\gamma_1 v^2)^2 = 0$

(28) $(x-a_2)^2 + (y-b_2)^2 + (z-c_2)^2 - (\beta_2-\gamma_2 v^2)^2 = 0$

(29) $(x-a_3)^2 + (y-b_3)^2 + (z-c_3)^2 - (\beta_3-\gamma_3 v^2)^2 = 0$

(30) $(x-a_4)^2 + (y-b_4)^2 + (z-c_4)^2 - (\beta_4-\gamma_4 v^2)^2 = 0$

These are four simultaneous equations for the four unknowns $x, y, x$ and $v$ in terms of the known quantities $a_1, a_2 \ldots b_1, b_2 \ldots \beta_1, \gamma_1, \ldots$ etc.

If the instantaneous direction of the velocity vector is desired, this can be obtained from the above result by differentiating with respect to time.

The coordinates of the position $x, y, z$ are now known from Equations 27-30. The components of the velocity are simply:

$$v_x = \dot{x}$$
$$v_y = \dot{y}$$
$$v_z = \dot{z}$$

Hence we have:

(31) $\quad \overline{R} = ix + jy + kz$

(32) $\quad \overline{V} = i\dot{x} + j\dot{y} + k\dot{z}$

Solutions for $\overline{R}$ and $\overline{V}$ may be calculated in vectorial computers, if desired.

Various modifications of the embodiment of invention which is described above may be effected by persons skilled in the art without departing from the scope and principle of invention as defined in the appended claims.

What is claimed is:

1. A navigational system employing a plurality of devices adapted to receive and pass transmitted energy having a frequency modified by Doppler frequency shift, said devices being positioned in a known location, an alpha computer connected to each of said devices, a gamma and beta computer connected to each alpha computer and a simultaneous equation solver receiving the output of the gamma and beta computers and yielding vehicle position and velocity information, each alpha computer having means for deriving the quantity alpha in terms of the known value of the velocity of the transmitted energy, the known value of the frequency of the transmitted energy and the frequency of the transmitted energy modified by Doppler frequency shift, said gamma and beta computer having means for squaring the alpha output of the alpha computers, means for differentiating with respect to time the output of the alpha computers and means connected to said squaring and differentiating means for deriving beta and gamma quantities as a function of alpha, the derivative of alpha with respect to time and the velocity of the transmitted energy and said simultaneous equation solver having means for computing the said vehicle position and velocity information in terms of the velocity of the source of said transmitted energy, the computed gamma and beta quantities and the known position coordinates of each of the said devices, the quantities alpha, beta and gamma being defined as follows:

$$\text{alpha } (\alpha) = V_0 \left(\frac{f_1}{f_0} - 1\right)$$

$$\text{beta } (\beta) = \left(1 + \frac{\alpha}{V_0}\right)\left(\frac{\alpha}{\frac{d\alpha}{dt}}\right)$$

$$\text{gamma } (\gamma) = \left(1 + \frac{\alpha}{V_0}\right)\left(\frac{1}{\frac{d\alpha}{dt}}\right)$$

wherein $f_0$ is sound frequency in water $V_0$ is sound velocity in water and $f_1$ is a Doppler shifted frequency.

2. A navigation system employing a plurality of devices adapted to receive and pass transmitted energy having a frequency modified by Doppler frequency shift, said devices being positioned in a known location, an alpha computer connected to each of said devices, a gamma and beta computer connected to each alpha computer and a simultaneous equation solver receiving the output of the gamma and beta computers and yielding vehicle position and velocity information, said solver being connected to receive coordinate position data for each of said devices, each alpha computer having means for deriving the quantity alpha in terms of the known value of the velocity of the transmitted energy, the known value of the frequency of the transmitted energy and the frequency of the transmitted energy modified by Doppler frequency shift, said gamma and beta computer having means for squaring the alpha output of the alpha computers, means for differentiating with respect to time the output of the alpha computers and means connected to said squaring and differentiating means for deriving beta and gamma quantities as a function of alpha, the derivative of alpha with respect to time and the velocity of the transmitted energy and said simultaneous equation solver having means for computing the said vehicle position and velocity information in terms of the velocity of the source of said transmitted energy, the computed gamma and beta quantities and the known position coordinates of each of the said devices, the quantities alpha, beta and gamma being defined as follows:

$$\text{alpha } (\alpha) = V_0 \left(\frac{f_1}{f_0} - 1\right)$$

$$\text{beta } (\beta) = \left(1 + \frac{\alpha}{V_0}\right)\left(\frac{\alpha}{\frac{d\alpha}{dt}}\right)$$

$$\text{gamma } (\gamma) = \left(1 + \frac{\alpha}{V_0}\right)\left(\frac{1}{\frac{d\alpha}{dt}}\right)$$

wherein $f_0$ is sound frequency in water, $V_0$ is sound velocity in water and $f_1$ is a Doppler shifted frequency.

3. A navigational system employing a plurality of devices adapted to receive and pass transmitted energy having a frequency modified by Doppler frequency shift, said devices being positioned in a known location, an alpha computer connected to each of said devices, means for inserting the frequency of the transmitted energy and its velocity in said alpha computer, a gamma and beta computer connected to each alpha computer and a simultaneous equation solver receiving the output of the gamma and beta computers and yielding vehicle position and velocity information, said solver being connected to receive coordinate position data for each of said devices, each alpha computer having means for deriving the quantity alpha in terms of the known value of the velocity of the transmitted energy, the known value of the frequency of the transmitted energy and the frequency of the transmitted energy modified by Doppler frequency shift, said gamma and beta computer having means for squaring the alpha output of the alpha computers, means for differentiating with respect to time the output of the alpha computers and means connected to said squaring and differentiating means for deriving beta and gamma quantities as a function of alpha, the derivative of alpha with respect to time and the velocity of the transmitted energy and said simultaneous equation solver having means for computing the said vehicle position and velocity information in terms of the velocity of the source of said transmitted energy, the computed gamma and beta quantities and the known position coordinates of each of the said devices, the quantities alpha, beta and gamma being defined as follows:

$$\text{alpha } (\alpha) = V_0 \left(\frac{f_1}{f_0} - 1\right)$$

$$\text{beta } (\beta) = \left(1 + \frac{\alpha}{V_0}\right)\left(\frac{\alpha}{\frac{d\alpha}{dt}}\right)$$

$$\text{gamma } (\gamma) = \left(1 + \frac{\alpha}{V_0}\right)\left(\frac{1}{\frac{d\alpha}{dt}}\right)$$

wherein $f_0$ is sound frequency in water, $V_0$ is sound velocity in water and $f_1$ is a Doppler shifted frequency.

4. A navigational system employing a plurality of devices adapted to receive and pass transmitted energy having a frequency modified by Doppler frequency shift, said devices being positioned in a known location, an alpha computer connected to each of said devices, means for inserting the frequency of the transmitted energy and its velocity in said alpha computer, a gamma and beta computer connected to each alpha computer, means for inserting the velocity of the transmitted energy into said beta computer, and a simultaneous equation solver receiving the output of the gamma and beta computers and yielding vehicle position and velocity information, said solver being connected to receive coordinate position data for each of said devices, each alpha computer having means for deriving the quantity alpha in terms of the known value of the velocity of the transmitted energy, the known value of the frequency of the transmitted energy and the frequency of the transmitted energy modified by Doppler frequency shift, said gamma and beta computer having means for squaring the alpha output of the alpha computers, means for differentiating with respect to time the output of the alpha computers and means connected to said squaring and differentiating means for deriving beta and gamma quantities as a function of alpha, the derivative of alpha with respect to time and the velocity of the transmitted energy and said simultaneous equation solver having means for computing the said vehicle position and velocity information in terms of the velocity of the source of said transmitted energy, the computed gamma and beta quantities and the known position coordinates of each of the said devices, the quantities alpha, beta and gamma being defined as follows:

$$\text{alpha } (\alpha) = V_0 \left(\frac{f_1}{f_0} - 1\right)$$

$$\text{beta } (\beta) = \left(1 + \frac{\alpha}{V_0}\right)\left(\frac{\alpha}{\frac{d\alpha}{dt}}\right)$$

$$\text{gamma } (\gamma) = \left(1 + \frac{\alpha}{V_0}\right)\left(\frac{1}{\frac{d\alpha}{dt}}\right)$$

wherein $f_0$ is sound frequency in water, $V_0$ is sound velocity in water and $f_1$ is a Doppler shifted frequency.

5. A navigation system employing a plurality of devices adapted to receive and pass transmitted energy having a frequency modified by Doppler frequency shift, said devices being positioned in a known location, an alpha computer connected to each of said devices, means for inserting the frequency of the transmitted energy and its velocity in said alpha computer, a gamma and beta computer connected to each alpha computer, means for inserting the velocity of the transmitted energy into said beta computer, and a simultaneous equation solver receiving the output of the gamma and beta computers and yielding vehicle position and velocity information, said solver being connected to receive coordinate position data for each of said devices, a recording and display device connected to said solver, each alpha computer having means for deriving the quantity alpha in terms of the known value of the velocity of the transmitted energy, the known value of the frequency of the transmitted energy and the frequency of the transmitted energy modified by Doppler frequency shift, said gamma and beta computer having means for squaring the alpha output of the alpha computers, means for differentiating with respect to time the output of the alpha computers and means connected to said squaring and differentiating means for deriving beta and gamma quantities as a function of alpha, the derivative of alpha with respect to time and the velocity of the transmitted energy and said simultaneous equation solver having means for computing the said vehicle position and velocity information in terms of the velocity of the source of said transmitted energy, the computed gamma and beta quantities and the known position coordinates of each of the said devices, the quantities alpha, beta and gamma being defined as follows:

$$\text{alpha } (\alpha) = V_0 \left( \frac{f_1}{f_0} - 1 \right)$$

$$\text{beta } (\beta) = \left( 1 + \frac{\alpha}{V_0} \right) \left( \frac{\alpha}{\frac{d\alpha}{dt}} \right)$$

$$\text{gamma } (\gamma) = \left( 1 + \frac{\alpha}{V_0} \right) \left( \frac{1}{\frac{d\alpha}{dt}} \right)$$

wherein $f_0$ is sound frequency in water, $V_0$ is sound velocity in water and $f_1$ is a Doppler shifted frequency.

References Cited by the Examiner
UNITED STATES PATENTS

| | | | |
|---|---|---|---|
| 1,785,307 | 12/30 | Hammond | 340—6 |
| 2,817,081 | 12/57 | Roberts | 343—9 |
| 2,968,034 | 1/61 | Cafarelli | 343—112 |
| 3,082,420 | 3/63 | Ramsayer | 343—113 |

KATHLEEN H. CLAFFY, *Primary Examiner.*

CHESTER L. JUSTUS, *Examiner.*